United States Patent [19]

Little, deceased et al.

[11] 4,147,142
[45] Apr. 3, 1979

[54] FUEL MODIFICATION SYSTEM FOR INTERNAL COMBUSTION ENGINES

[76] Inventors: Allan V. Little, deceased, late of Cheltenham, Australia, by Anna Little, administratrix, 2 Shadwell St., Cheltenham, Victoria, Australia; Ronald A. Wilkinson, 11 Hutchison Ave., Beaumaris, Victoria, Australia, 3193

[21] Appl. No.: 666,207

[22] Filed: Mar. 12, 1976

[30] Foreign Application Priority Data

Mar. 14, 1975 [AU] Australia ................................ 907/75

[51] Int. Cl.² ............................................ F02M 31/00
[52] U.S. Cl. .................................. 123/133; 123/122 E; 123/3
[58] Field of Search ................. 123/122 E, 133, 3; 48/205 R, 205 A, 211

[56] References Cited

U.S. PATENT DOCUMENTS

| | | | |
|---|---|---|---|
| 1,361,503 | 12/1920 | Smith | 123/122 E |
| 2,882,882 | 4/1959 | Pantano | 123/122 E |
| 3,283,841 | 1/1974 | Hirschler | 123/122 E |
| 3,635,200 | 1/1972 | Rundell | 123/122 E |
| 3,738,334 | 6/1973 | Farr | 123/122 E |
| 3,762,378 | 10/1973 | Bitonti | 123/122 E |
| 3,789,817 | 2/1974 | Morel | 123/122 E |
| 3,799,125 | 3/1974 | Hutchinson | 123/3 |
| 3,807,377 | 4/1974 | Hirschler | 123/122 E |
| 3,828,736 | 8/1974 | Koch | 123/3 |
| 3,832,985 | 9/1974 | Edde | 123/122 A |
| 3,855,980 | 12/1974 | Weisz | 123/122 E |
| 3,930,476 | 1/1976 | Koch | 123/122 A |
| 4,008,692 | 2/1977 | Shinohara | 123/122 E |

FOREIGN PATENT DOCUMENTS

735441 11/1932 France .................................. 123/122 E

*Primary Examiner*—Ronald H. Lazarus
*Attorney, Agent, or Firm*—Shlesinger, Arkwright, Garvey & Dinsmore

[57] ABSTRACT

Apparatus for modifying fuel, including a housing heatable by exhaust gases to effect vaporization and/or thermal cracking and a catalytic reactor for catalytic cracking of the vaporized and/or thermally cracked fuel, the reactor providing gaseous fuel for supply to the engine fuel induction system; and an engine having a fuel supply system incorporating such apparatus.

35 Claims, 6 Drawing Figures

FUEL MODIFICATION SYSTEM FOR INTERNAL COMBUSTION ENGINES

This invention relates to a system for modifying fuel for internal combustion engines such as for automotive or marine use and, in particular, for modifying petrol by vapourization and/or cracking.

Increasing concern about the role played by the automobile as a major contributor to aerial pollution has led to intensified research into means of controlling the composition of exhaust gases of the petrol (gasoline) engine. Lack of control over the chemical reactions occurring during combustion is the direct result of an expedient approach on the part of the manufacturer, for it has long been known that the requirements for rapid increases in power output during normal driving are assisted by an increase in the fuel/air ratio.

The fuel/air ratio (mixture strength) is, at any time, primarily dependent upon the design of the fuel metering equipment. Control of the chemical reactions, however, is dependent mainly upon physical and physicochemical factors rather than mathematical ones. Present-day metering devices used on mass-produced automobiles cannot provide the correct condition for efficient combustion of present-day liquid fuel mixtures.

Liquid fuel carburettors presently in use fall into two main classes: namely, i. atmospheric pressure spray system—the two-fluid spray, which can be further subdivided into static and dynamic types; and
ii. above atmospheric pressure spray system—single fluid spray, known as fuel injection.

By far the most serious disadvantage suffered by all spray carburettors is their inability to cope with the large differences in both density and viscosity which exist between the metered fluids viz. air and fuel. Carburettors are volume proportioning devices. Thus very small volumes of (high density) fuel are required for large volumes of (low density) air, particularly since nitrogen, which accounts for almost 80% of the air inspired, contributes nothing to the exothermic reactions of combustion. For a stoichiometric reaction mixture, only about 2% of total inspired volume is fuel when calculated on a volume basis with the fuel in a vapour state. Thus the metering of small volumes of liquid fuel require small metering orifices which must be carefully designed around the viscosity characteristics of fluid flow.

Static type carburettors using submerged jets require air correction at high gas velocities through the choke tube. Dynamic carburettors using an annular metering orifice, which is also the discharge orifice, exhibit complex discharge characteristics. These require correction in the form of a complex metering needle profile.

Two-fluid spray type carburettors also suffer (a) settling out of fuel spray in the intake manifold, which often is aggravated by impingement upon the throttle plate; and
(b) variable vacuum flash-off in the intake manifold as a function of engine load.

At small throttle openings, flash-off is maximal and gas velocity minimal. At wide throttle openings, virtually no vacuum flash-off occurs, and vapourization of the fuel can only take place via heat radiation and conduction to both the entrained spray and settled-out fuel. But since velocities in the manifold are high, little time is available for vapourization which must finally be required to be completed in the combustion chamber. This applies particularly to the higher boiling point fractions of the fuel. Fuel injection systems rely for vapourization upon heat relation to the more finely dispersed fuel droplets.

For the exothermic reaction of carbonaceous fuels with oxygen, they must be in a gaseous or vapour state. However, the rate and mechanistic pathway by which the fuel is burned depends, inter alia, upon whether all of the fuel/air mixture is physically homogeneous or heterogenous of state.

If the mixture is physically homogenous, burning takes place by a reasonably uncomplicated hydroxylation free radical mechanism to the end products carbon dioxide ($CO_2$) and water ($H_2O$). If liquid and/or solid particles are present and if the speed of flame propagation is high some heat energy is used in thermal cracking of the fuel. During this thermal cracking smaller molecular fragments, including radicals, may (a) react with $O_2$ is a more complex way than that of the hydroxylation mechanism referred to above. Unstable peroxides can form which in turn decompose uncontrollably to produce a variety of organic end products, e.g. ethers, acids and esters;

(b) polymerize to higher molecular weight products—e.g. large hydrocarbon molecules;

(c) react with other radical intermediates again producing various organic end products; and (d) dehydrogenate with formation of element carbon.

Wherever thermal cracking of high boiling point fuel occurs in the combustion chamber of spark ignition engines, there is usually insufficient oxygen available in the regions of high hydrocarbon concentration for completion of combustion within the time available.

Clean, complete combustion is therefore not possible at high speeds in engines using spray system carburetion.

It follows from the above discussion that almost all of the deficiencies of spray systems are absent in the gas carburettor/manifold system of fuel feed. However, gas engines suffer the obvious practical disadvantages of fuel storage space at low pressure or heavy tank and space requirements at high pressure.

It is desirable to modify the chemical composition of the petroleum fuel as well as providing the required physical state for combustion. The requirement by regulation for vehicle manufacturers to meet pollution standards through the use of lead-free fuels imposes an octane rating limitation on fuels or an increased refining cost to maintain the rating through the use of increased quantities of reformed hydrocarbons.

It has been found that these limitations and costs can, however, be avoided by up-grading the preferably lead free fuel by the use of waste exhaust heat. This is achieved by thermal vapourization and/or cracking before metering to the air stream. During the cracking short chain hydrocarbons, including methane ($CH_4$), may be produced.

In addition any elemental hydrogen formed can serve three main functions:

1. It provides an important additional source of hydroxyl radicals for the propagative combustion reactions of carbon fuels to carbon dioxide. In particular carbon monoxide can only oxidize at a significant rate to carbon dioxide via the hydroxyl radical reaction, $$CO + .OH \rightarrow CO_2 + H.$$

and H.+O$_2$→.OH+O. is the oxygen-consuming reaction. The efficiency of conversion of CO to CO$_2$ is not primarily dependent upon oxygen supply but upon the ability of the combustion mixture to provide a source of hydroxyl radicals from water or hydrogen, water being formed as an end product of the proceeding hydrocarbon oxidation. The hydroxyl radicals derived from water must arise via an endothermic back reaction in the presence of a catalyst (i.e. a radical M*):

$$M^* + H_2O \rightarrow .OH + H. + M^*$$

or alternatively depend upon the prior production of O. or H. radicals:

$$H. + H_2O \rightleftharpoons H_2 + .OH$$

and $$O. + H_2O \rightleftharpoons 2.OH$$

The addition of hydrogen to the fuel on the other hand provides a net exothermic production of .OH radicals to improve the efficiency of carbon dioxide formation.

2. The wide flammability limits and higher flame speed of hydrogen are important in assisting the ignition and flame propagation of lean mixtures-which are defined as those air/fuel ratios in excess of the stoichiometric value—and, in accordance with the known fact, nitrogen oxide (NO$_x$) formation will decrease with increasing degree of lean-ness provided a progressive flame front is maintained.

3. Some elemental hydrogen is capable of being selectively diffused to catalytic exhaust reactors for the purpose of reducing any oxides of nitrogen (NO$_x$) that are produced during combustion back to elemental nitrogen.

The present invention is concerned with providing an improved fuel modifier suited for modification of the physical state and/or the chemical composition of a fuel such as petrol. The invention also is concerned, but not exclusively, with an improved fuel modifier suited to provide fuel for use in a gas/gas carburettor system and, in particular, such a carburettor system having a bi-functional fuel metering system such as disclosed in our copending application, Ser. No. 666,448, filed Mar. 12, 1976.

The fuel modifier may comprise a liquid fuel vapourization and/or fuel cracking stage or stages.

In one aspect, the present invention provides apparatus for use in modifying fuel for an internal combustion engine fuel system, comprising a housing defining a chamber having an inlet and an outlet for passage of fluid hydrocarbon fuel therethrough, the chamber having therein means defining a tortuous or labyrinth path for the fuel in flow from the inlet to the outlet, the housing being adapted for external heating whereby fuel received at the inlet as a liquid is vaporized and/or thermally cracked during flow to the outlet.

The housing may be adapted to be mounted in an exhaust system for the engine whereby heating of the housing is effectable by contact with exhaust gases of the engine. For this purpose, the housing may be mounted within a portion of an exhaust duct, such that the inlet and outlet are spaced longitudinally of that duct portion, the inlet being in communication with the exterior of the duct portion through a conduit extending laterally through a wall defining the duct portion and adapted for connection to a source of fuel for the engine. The inlet may be in communication with a conduit extending longitudinally of the duct portion, the outlet conduit being adapted for connection to the fuel induction system of the engine, the arrangement being such that flow of fuel between the inlet and outlet is counter-directional to exhaust gas flow through the duct portion.

The housing of the apparatus may be defined by an outer encircling wall and an inner wall defining a bore extending through the housing, the inner and outer walls defining the chamber therebetween, whereby hot exhaust gases may flow through and around the chamber. Such housing may be of annular form, the means therein defining a tortuous or labyrinth path being in the form of a helical baffle, with the inlet and outlet each being adjacent a respective end of the baffle.

The baffle or baffles of the chamber of the first stage may be shaped and/or positioned so as to impart a whirling motion to fuel fed thereto. Such motion may be such as to give rise to centrifugal forces which enhance contact and hence heat exchange between the fuel and surfaces of the chamber, to effect vaporization and/or thermal cracking of fuel passed through the chamber.

In a second aspect, the present invention provides apparatus for use in modifying fuel for an internal combustion engine fuel system, comprising a housing defining a chamber having an inlet and an outlet for passage of fluid hydrocarbon fuel therethrough, the housing being adapted for direct, external flame heating, whereby fuel received at the inlet is vaporized and/or thermally cracked during flow to the outlet.

The chamber may be adapted for direct flame heating thereof for heating fuel passed therethrough, such as by positioning the chamber within an outlet manifold for the engine; the housing defining an elongate chamber extending within the manifold at least once across inlet ports thereof, the outlet of the chamber being in communication with a conduit extending through a defining wall of the manifold and adapted for connection to the fuel induction system of the engine.

Such stage, hereinafter referred to as the second stage, may be used for vaporization and/or thermal cracking of fuel passed therethrough.

In a third aspect, the invention provides apparatus, hereinafter referred to as a third stage, for use in modifying fuel for an internal combustion engine fuel system, comprising means defining a housing for a cracking catalyst for hydrocarbon fuel, the housing having an inlet by which fuel is receivable and an outlet connectable to the fuel induction system of the engine.

Such third stage may be of a form having provision for passing fluid between walls defining the chamber for modifying the temperature of catalyst and fuel in the chamber. Thus, the housing defining means may include a heavy walled metal enclosure for the catalyst mounted on an exhaust manifold for the engine, the walls of the enclosure having a duct therein in communication with the interior of the manifold, there being valve means for controlling flow of exhaust gas from the manifold through the duct and operable on attainment of a predetermined housing temperature to close the duct against such flow. The valve means may have associated therewith temperature responsive means for opening and closing the duct.

The apparatus of the first, second and/or third aspects may be used in combination, with the output of the chamber of the first being in communication with the inlet to the second or third or the output of the second chamber being in communication with the third.

In one form, all three aspects are used in conjunction, the invention in a fourth aspect therefore providing apparatus for use in modifying fuel for an internal combustion engine fuel system, comprising first and second housings defining respective first and second chambers each having an inlet and an outlet, with the outlet of the first chamber being in communication with the inlet of the second chamber, the first chamber having therein means defining a tortuous or labyrinth path for fuel in flow from the inlet to the outlet thereof, the first chamber being adapted for external heating whereby fuel received at the inlet as a liquid is vaporized and/or thermally cracked during flow to the outlet, and means defining a housing for a cracking catalyst for hydrocarbon fuel having an inlet, in communication with the chamber outlet for receiving fuel therefrom, and an outlet connectable to the fuel induction system of the engine for the supply of fuel after passage through the catalyst, the second housing being adapted for direct, external flame heating, whereby fuel received at the inlet is vaporized and/or thermally cracked during flow to the outlet, and means defining a housing for a cracking catalyst for hydrocarbon fuel having an inlet, in communication with the chamber outlet for receiving fuel therefrom, and an outlet connectable to the fuel induction system of the engine for the supply of fuel after passage through the catalyst; the apparatus further comprising means defining a third housing for containing a cracking catalyst for hydrocarbon fuel and having an inlet and outlet, the third housing inlet being in communication with the second chamber outlet and the third housing outlet being connectable to the fuel induction system of the engine.

In a further aspect there is provided an internal combustion engine having a fuel induction system for metering of gaseous hydrocarbon fuel to the engine, and a fuel modification means for cracking fuel received by the induction system, the modification means including apparatus according to any one of the preceding aspects or forms.

In one form, the engine has a fuel induction system for metering of gaseous hydrocarbon fuel, a modified-fuel supply system, and an exhaust system; the modified-fuel supply system comprising a source for liquid hydrocarbon fuel, a first fuel modification stage for receiving fuel from the source and including a housing positioned for contact with hot exhaust gases of the engine whereby fuel passing therethrough is vaporized and/or thermally cracked, a second fuel modification stage for receiving fuel from the first stage and including a housing positioned for direct flame contact with exhaust gases of the engine whereby fuel passing therethrough is vaporized and/or thermally cracked, and a third fuel modification stage for receiving fuel from the second stage and including a housing for hydrocarbon fuel cracking catalyst wherein fuel passing therethrough may be catalytically cracked; and means connecting the third stage to the fuel induction system for supply to the engine.

In such form of engine, there may be a fuel circuit for by-passing the modified-fuel supply system for supply of liquid fuel to the fuel induction system, the by-pass circuit having associated therewith means responsive to engine operating temperature to close the by-pass circuit at a predetermined engine temperature and bringing the modified-fuel system into communication with the induction system. The by-pass circuit and the modified-fuel system each may have a control valve, the associated means being a thermo-switch adapted to close and open the valve of the by-pass circuit and open and close the valve of the modified-fuel system in dependence of the engine temperature being at or below the predetermined temperature.

The by-pass circuit may further include a float controlled fuel bowl for receiving fuel from the source via the control valve of the circuit, and for supplying fuel to a jet bridge of the induction system via a second control valve of the circuit, the second control valve openable and closable with opening and closing of the first-mentioned control valve of the circuit.

In the foregoing apparatus and engine based thereon, there may be an accumulation chamber for storing gaseous hydrocarbon fuel that is non-condensable at ambient temperature, the accumulation chamber having an inlet in communication with a conduit providing communication between the outlet of the second chamber and the inlet of the third housing and/or a conduit for providing communication between the outlet of the third housing and the fuel induction system of the engine, and an outlet for providing communication between the accumulation chamber and the engine induction system. The accumulation chamber may have a further outlet, for recycling any condensed fuel accumulating therein, the further outlet being in communication with a conduit connected to the inlet of the first chamber. Additionally, the accumulation chamber may be provided with cooling means for cooling fuel supplied thereto and thereby separating condensable and non-condensable fractions of such fuel.

In order that the invention may be more readily understood further description thereof now will be provided with reference to the aspects and/or embodiments shown in the accompanying drawings, in which.

Figure 1:
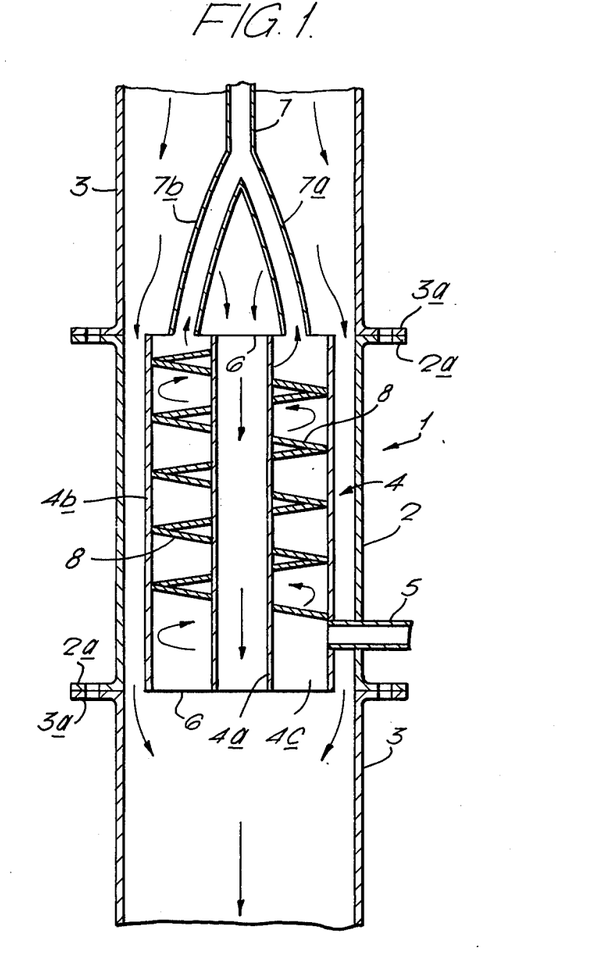
FIG. 1 shows a sectional view of a first stage fuel modifier.

With reference to FIG. 1 there is shown a first stage fuel modifier 1 mounted for exposure to hot exhaust gases in a separable portion of an exhaust outlet; portion 2 being connectable to pipes 3 of the exhaust outlet by flanges 2a, 3a.

The fuel modifier 1 comprises a container 4 defining an annular chamber and having concentric inner and outer cylindrical walls 4a, 4b mounted within portion 2 by means of an inlet pipe 5 which passes through the wall of portion 2 and communicates with the annular chamber through, and at one end of, outer wall 4b. The container is completed by two annular end plates 6, of which the one remote from inlet pipe 5 is provided with substantially diametrically opposed arms 7a, 7b of outlet pipe 7.

Intermediate inlet and outlet pipes 5 and 7, the container 4 is provided with a helical baffle, defining within the annular chamber a tortuous flow path for fuel introduced through inlet pipe 5. Under normal flow conditions for fuel introduced to the chamber through inlet pipe 5, baffle 8 can impart to the fuel a centrifugal force which enhances contact of spray formed by rapid boil off with surfaces of the container defining the chamber; the latter being heated by hot exhaust gases which flow around wall 4b and through the core defined by wall 4a. The container, as indicated, has outlet 7 upstream with respect to the flow of exhaust gases.

The baffle 8 is spaced from the end plate 6 adjacent inlet pipe 5 to provide a small sub-chamber 4c. The latter collects fuel condensate on cooling.

Inlet pipe 5 is connectable to a source of fuel, such as petrol, to be modified; while outlet 7 is connectable to a pipe for passing modified fuel issuing from the container to a further fuel modifier stage.

First stage fuel modifier 1 is particularly suitable for modifying petrol by converting it to vapour. However, depending on the temperature attainable, some thermal cracking of the petrol also may be achieved.

The container 4 of fuel modifier 1 can be made of any suitable metal, although stainless steel generally is preferred. The walls preferably are of a light gauge material to minimize the time for attainment of an equilibrium temperature and to enhance heat transfer.

Figure 2:
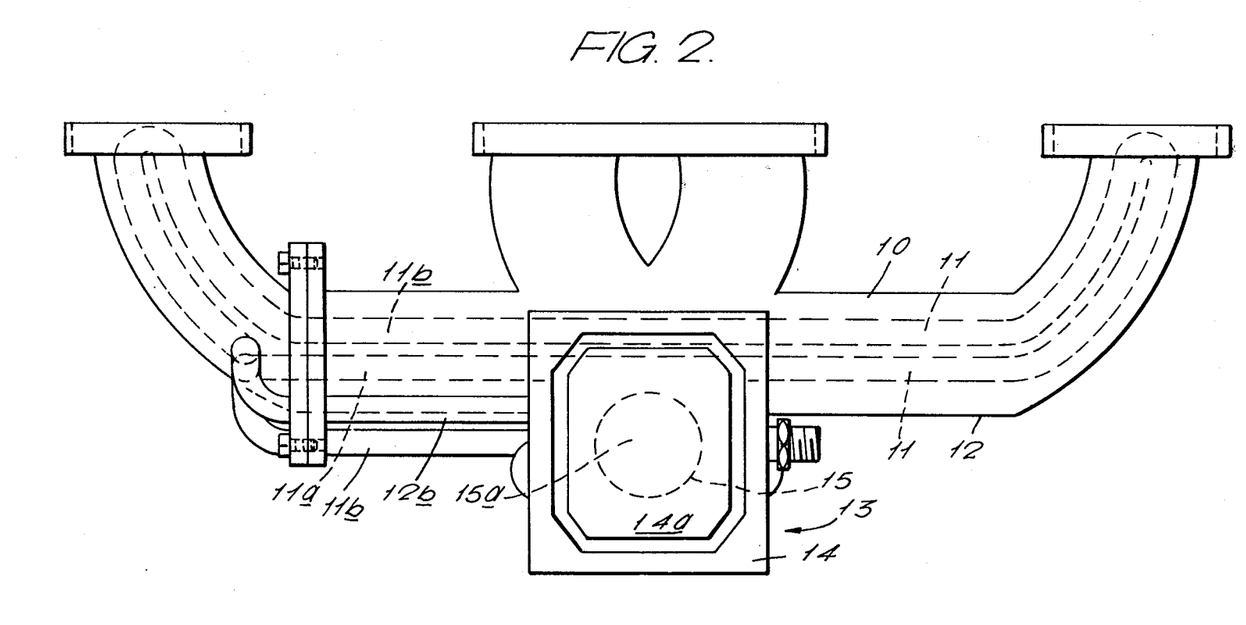
FIG. 2 shows a plan view of second and third stage fuel modifiers.
Figure 3:
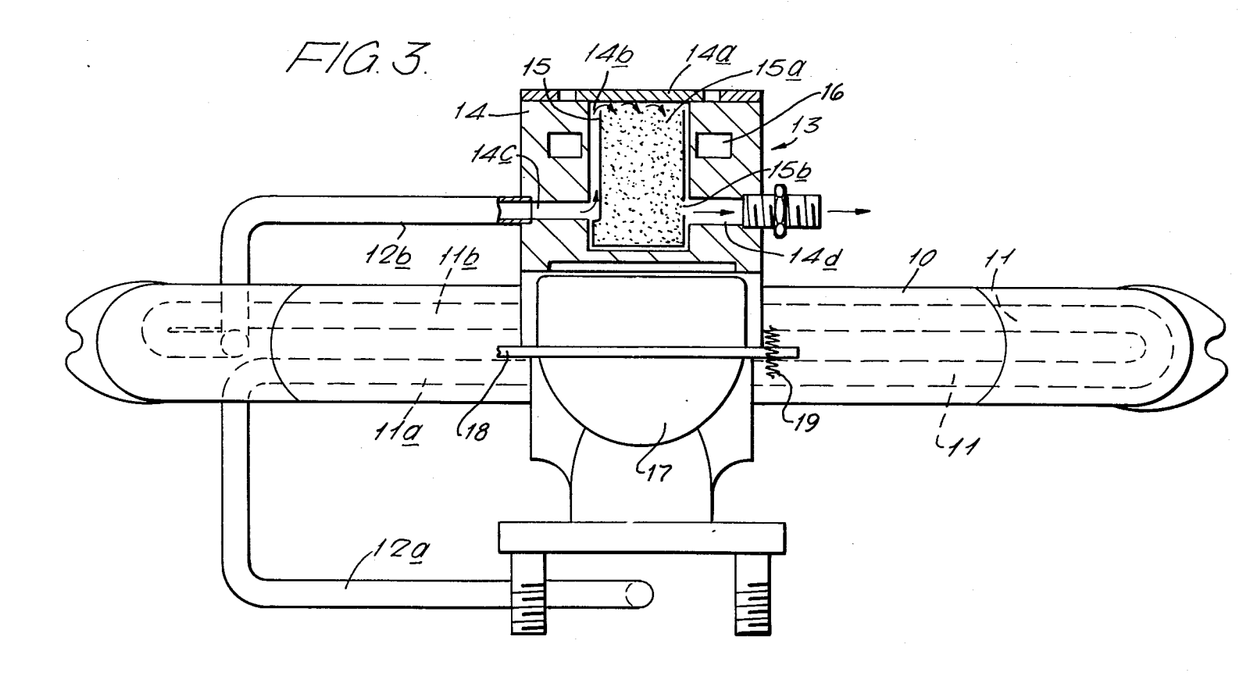
FIG. 3 shows a side elevation, partly in section, of the modifiers of FIG. 2.

With reference to FIGS. 2 and 3, the second stage fuel modifier 10 comprises an elongate chamber 11 defined by a continuous length of ducting formed into a pair of adjacent crescent shaped portions 11a, 11b. The chamber 11 is located within an exhaust manifold 12 for direct flame heating by exhaust gases; with the crescent shaped portions conforming usually to the outer curvature of the manifold. The free end of portion 11a communicates through the wall of the manifold with an inlet pipe 12a by which fuel to be modified, such as vaporized and/or partly cracked fuel from the first stage, is introduced into the chamber. The free end of portion 11b communicates through the wall of the manifold with an outlet pipe 12b which receives from chamber 11 fuel modified therein.

The chamber 11 may be made of any suitable metal, and preferably is of relatively heavy wall tubing.

The chamber is positioned as close as possible to the exhaust of at least one of the branches of the manifold for maximum heating.

Fuel received in the second stage, such as from the first stage, is modified primarily by thermal cracking. Some vapourization also can occur although this largely will be of condensate.

The temperature of the exhaust gases within the manifold varies with engine loading and therefore tends to provide differing thermal cracking conditions. This mostly is off-set by the fact that the residence time of fuel vapours within chamber 11 is inversely related to engine load.

With further reference to FIGS. 2 and 3, the third stage fuel modifier 13 consists of a housing 14 having a removable top 14a covering a centrally disposed chamber 14b in which is positioned a replaceable, open topped canister 15 of filter supported hydrocarbon cracking catalyst 15a. Toward the bottom of canister 15 the housing 14 is provided with an inlet 14c, connected to outlet pipe 12b from the second stage, and an outlet 14d substantially opposed to inlet 14c. Thus, modified fuel such as that received from the second stage can pass into the chamber 14b wherein it flows upwardly to enter canister 15; and then flows downwardly through the cracking catalyst in the latter to issue from outlet 14d, for combustion in an engine, via an opening 15b in and towards the bottom of the canister and adjacent outlet 14d.

The housing 14, mounted on exhaust manifold 12 such as by bolts, preferably is of a substantial thickness of a suitable metal and preferably is of heavy iron cast construction. The housing 14 has formed in its wall defining chamber 14b a duct 16 which extends around that chamber and communicates, via an inlet and outlet, with the interior of manifold 12 whereby exhaust gases in the manifold can flow around chamber 14b. A valve 17, pivotable on shaft 18 under the action of thermostat spring 19, is operable to open and close duct 16 with respect to the interior of the manifold to thereby permit or prevent flow of exhaust gases around chamber 14b. The arrangement is such that until a predetermined temperature is attained in chamber 14b, and hence in gaseous fuel passing from outlet 14d, spring 19 is operable to hold valve 17 open to permit exhaust gases to flow in duct 16 for rapid heating of housing 14 (heating also being effected by fuel received through inlet 14c) and thereafter operable to close valve 17.

On attainment of a required temperature, further heating of housing 14 due to its mounting on manifold 12 is off-set by convection and radiation losses, such that the housing 14 acts as a heat sink for the high temperature fuel passed thereto, preferably such that the temperature of the modified fuel issuing therefrom seldom rises about 200° C. During the heat-up period following engine start-up, any liquid fuel, which generally will be condensate, will be vaporized.

The housing 14 can be provided with a palladium diffuser (not shown) for the selective separation of hydrogen which may be fed via a restrictor to the exhaust system containing catalytic reactors for the removal of oxides of nitrogen.

Should the gases emerging from the third stage rise above 200° C. under conditions of heavy load operation, a bimetal valve, interposed between the third stage and the metering unit, will admit lower temperature fuel from the first stage until the temperature returns to 200° C. The valve is so constructed that fuel flows directly over the bimetal element at all times. Emerging fuel is led directly to the lower chamber of the metering carburettor via a shut-off valve.

Figure 4:
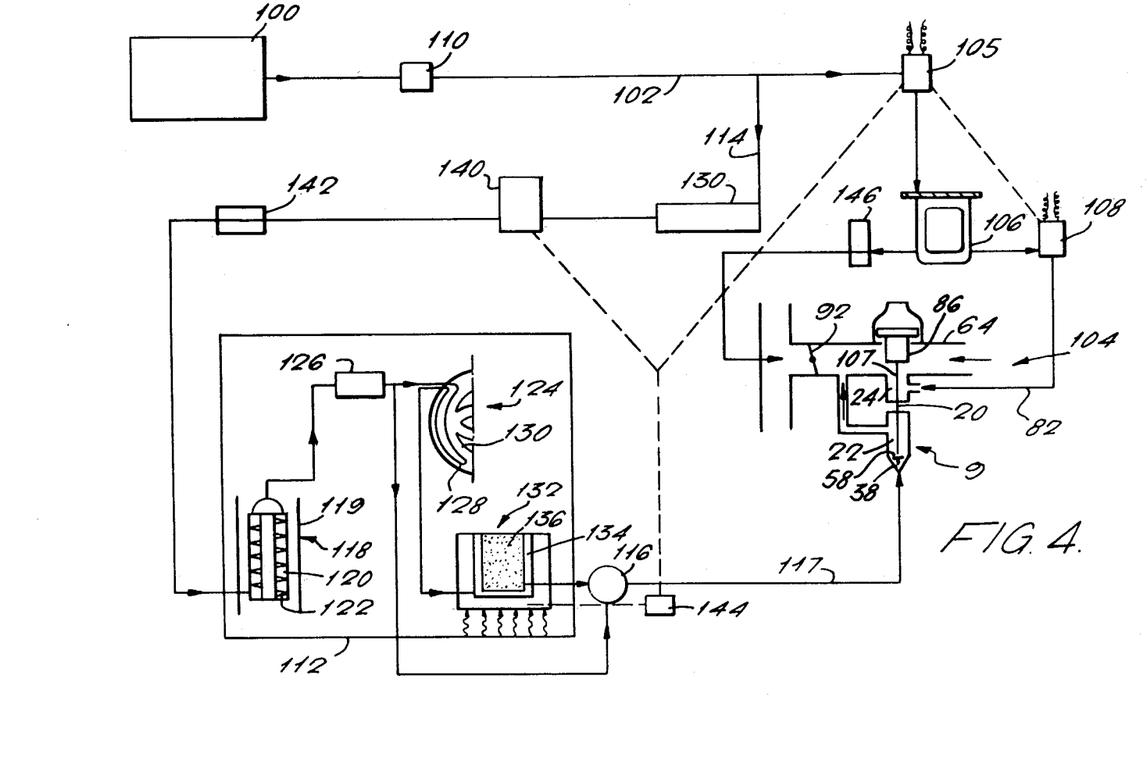
FIG. 4 is a schematic representation having three modifier stages of the general form shown in FIGS. 1 to 3.

With reference to FIG. 4, there is shown a fuel system including a petrol tank 100 connectable by a liquid-fuel line 102 to a carburettor system 104, via a solenoid actuated valve 105, a float controlled fuel bowl 106 and a solenoid actuated needle valve 108. The line 102 terminates at a connector 82 for delivering liquid fuel to a first chamber 24, for liquid fuel, of a bifunctional fuel metering device such as disclosed in our co-pending application, Ser. No. 666,448, filed Mar. 12, 1976, the disclosure of which is incorporated herein by reference. A low pressure fuel pump 110 in line 102 draws the petrol from the tank.

Line 102 is connected downstream of pump 110 to a petrol vapourizer and/or cracker unit 112 by a branch liquid-fuel line 114; with the outlet of unit 112 being connected via thermostat valve 116 to a second chamber 22, for gaseous fuel, of the bifunctional fuel metering device through gaseous fuel line 117.

The first fuel modifier stage 118 of unit 112 consists of a chamber 120 having therein a baffle for example of helical form, or a multiplicity of baffles 122 defining a tortuous flow path. The primary function of stage 118 is to vaporize petrol, although it can provide a measure of thermal cracking, and for this purpose it is heated by hot exhaust gas such as by being positioned within an exhaust outlet 119.

The second stage 124 of unit 112, comprises a heatable duct 128 and receives vaporized fuel, via a pressure regulator 126, from stage 118. The vapourized fuel is further heated in duct 128, such as by duct 128 being positioned in the exhaust manifold 130 to receive direct flame heating.

The third stage 132 of unit 112 receives cracked vapour from the second stage. Stage 132 comprises a housing 133 defining a chamber 134 around which exhaust gases are passed, such as through ducting in the walls of housing 133, when the engine is cold but which is short circuited of such gases after heat-up; the chamber 134 containing a cracking catalyst and filter 136 through which the partly cracked vapour from chamber 134 is passed. Chamber 134 also can contain a unit (not shown) comprising a palladium diffuser for selective separation of hydrogen, a restrictor valve from which the hydrogen may be fed, and catalytic reactors, for example, in the exhaust system, for removal of nitrogen oxides from the hydrogen fed thereto via the restrictor valves.

Petrol is drawn into line 114 by means of a high pressure pump 138 and passes to unit 112 via a solenoid valve 140 and flow controller 142 sensitive to engine load.

The third stage 134 has associated therewith a thermo-switch 144 which is electrically connected, as shown in FIG. 4 by broken lines, to solenoid needle valve 108, via solenoid valve 105, and to solenoid valve 140. During engine operation on liquid fuel, such as before attainment of a predetermined engine temperature as detected by switch 144, the switch 144 actuates solenoid valve 140 to close and actuates solenoid valves 105 and 108 to open to permit flow of liquid petrol to float valve 106 and from the latter to the liquid fuel chamber 24 of the carburettor system. For cold start-up liquid petrol then passes direct to the inlet manifold 64 or just downstream of throttle butterfly valve 92 of the carburettor system via electrically or mechanically operable auxiliary start-up valve 146. For operation on cracked petrol vapour on attainment of the predetermined engine temperature, switch 144 actuates solenoid valve 105 and 108 to close to terminate flow to the first chamber 24, and actuates valve 140 to open to pass petrol to unit 112 for generation of cracked petrol vapour to be passed to the second, gaseous fuel chamber 22 of the carburettor system. Solenoid valves 105, 108 and 140 thus, positively isolate the parts of the system used for liquid fuel or gaseous fuel operation and which are not required at any particular time; i.e., during warm-up or, in the event of malfunction, to isolate the defective part.

In an alternative form, switch 144 may be of a type operable, in dependence on the pressure of gaseous fuel available for supply to fuel chamber 2, to control valves 105, 108 and 140; the latter being electrically, electromechanically, pneumatically or hydraulically operable. Thus, if available gaseous fuel pressure is below a predetermined level, switch 144 will close valve 140 and open valves 105 and 108 for engine operation on liquid fuel via chamber 24 and, when gaseous fuel pressure exceeds the predetermined level, it will close switches 105 and 108 and open switch 140 for engine operation on gaseous fuel via chamber 22.

Operation of the system now will be described with reference to FIGS. 4 and 5.

The carburettor system 9 may be mounted on a normal engine inlet manifold, or, preferably, on a manifold designed for gas flow alone rather than one designed to cope with separated fuel spray. The manifold preferably should be completely separate from the exhaust system and the engine water cooling system i.e. no heated risers or main tracts, and kept as cool as possible.

The carburettor system utilizes the float controlled fuel bowl 106 for starting and warm-up, during which the solenoid needle valve 108, which may be mounted on the bowl, provides control of petrol feed to the carburettor jet bridge 107, associated with the first fuel chamber, and controlled change-over to gaseous fuel.

The high pressure fuel pump 138 should be fitted with a non-return valve, and preferably a pressure gauge, in the outlet from the pump to prevent gaseous fuel venting through the pump should the fuel pump cease to operate whilst the ignition switch and high pressure fuel solenoid are activated.

The load sensing fuel flow controller 142 may be mounted in any convenient position but preferably removed from exhaust heat. A diaphragm chamber of the controller preferably is connected directly to the inlet manifold to permit monitoring of the engine load as indicated by pressure in that manifold for control of flow from pump 138 to unit 112 and the second, gaseous fuel chamber 22.

Figure 5:
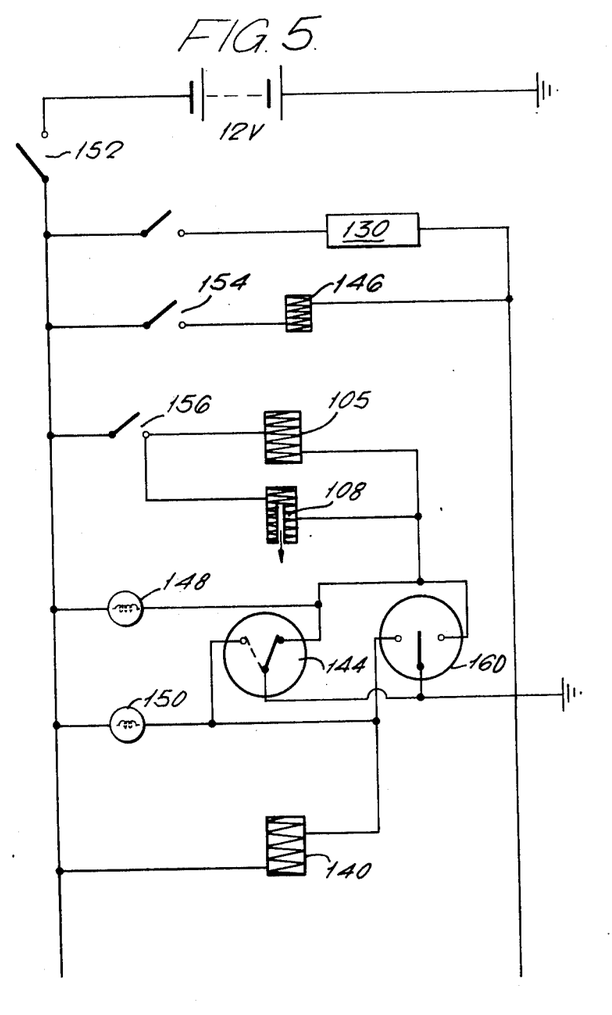
FIG. 5 is an ignition circuit for use with the system of FIG. 4.

Suitable electrical connections are shown in the wiring diagram of FIG. 5. As indicated in FIG. 5, warning lamps 148, 150 indicate which of liquid or gaseous fuel systems, respectively, is operating, or will operate, when switch 152 of the ignition circuit is closed.

For start-up and drive away in cold conditions, the ignition circuit switch 152 is closed; the "choke" switch 154 is closed or the mechanical starting carburettor valve is operated; and the "manual off" switch 156 is closed; after which the "spray fuel" lamp 148 will indicate. With manual override switch 160 in the "off" position, a switch 161 of the high pressure fuel pump is actuated. The engine then is cranked with the starter motor and, after the engine fires, the choke switch 154 is opened. The engine now runs normally on the spray function of the carburettor being fed liquid fuel from the low pressure fuel pump via the spray fuel solenoid and needle valves; these being activated by the position of the thermo-switch 144 inserted e.g. in the exhaust manifold.

The vehicle can now be driven away. From the instant of starting, the three stages of the fuel modification unit 112 heat rapidly, particularly with the engine under load. During this heat up period, condensed fuel in unit 112 from previous operation is vapourized and expelled from the gas port in the carburettor since, as long as the engine is operating, a cracked gaseous fuel shut-off valve member 58 controlling feed to the second fuel chamber is free to lift off its seat 38. At a predetermined temperature, governed e.g., by catalyst chamber requirement and fuel boiling range, the thermoswitch 144 shuts off the spray fuel supply, simultaneously feeding fuel to the first stage modifier 118 for vapourization. Pressure rises rapidly throughout the whole system, whereupon cracked gaseous fuel commences to flow to chamber 22 at exactly the required rate predisposed by the position of the air valve 86 which monitors the engine speed and load at all times and, hence, the degree to which valve member is lifted from seat 38 with needle 20. It is therefore of no importance whether the switch-over point is reached at no load (idling), light load, or heavy load conditions; temperature being the parameter determing switch-over. A smooth changeover without loss of power, or misfiring is affected.

For as long as the major components retain considerable heat, pressure will be retained within the gas injection system. The metering needle 20, common to chambers 22 and 24, will cause the shut-off valve member 58 to rest on its seat 38 at the inlet to chamber 22 and all electrically operated valves will be closed with the ignition off. On hot restart, cranking the engine causes the air valve 86 to lift thus freeing the gas shutoff valve member 58. Cracked gaseous fuel pressure within the system lifts the needle from its seating, and the gaseous fuel is discharged into the inspired air in duct 64 and the engine fires immediately.

For warm restart after pressure drop within the gaseous fuel system, the thermoswitch may have returned the system to spray operation. In this case subsequent events will be the same as cold start except that there will be no need for "choke" operation i.e. the engine should fire on the spray system.

If, however, the thermoswitch has not reset for operation of the spray system, fuel spray operation can be achieved for a short period by use of the manual override switch 160 shown in the wiring diagram. As soon as full gaseous fuel pressure is achieved the switch can be returned to the "off" position.

No special procedures are required for shut-down. The engine may be stopped without lowering the fuel pressure. Condensation in unit 112 occurring during cooling can assist in getting the vehicle away after a cold restart since this fuel vapourizes during warm-up and enriches the spray mixture. It therefore allows the use of a "lean profile" taper on the spray metering tapered section at bridge 107 of the metering needle 20 associated with chamber 24.

In one form of the system of FIG. 4, the low pressure fuel pump 110 delivers petrol at 2 PSIG or higher and may comprise a standard electrical or mechanical fuel pump of the conventional carburettor fitted engine. High pressure fuel pump 138 also may be electrical or mechanical, and preferably has a non-return valve in its outlet and delivers petrol at 30 PSIG or higher. The flow controller 142 preferably is a vacuum system diaphragm valve which allows full fuel flow except at times of closed-throttle operation, i.e., idling or closed throttle overrun, with fuel flow in the latter case being restricted by adjustable by-pass valve 143.

The fuel system is capable of supplying an engine with a substantially constant fuel/air ratio over the whole range of speed and load requirements by functioning primarily as a gas/gas metering system in place of the usual gas/liquid system.

Operation of the system can be achieved without pressure regulator 126 but not without hunting at wide throttle openings due to the rapid change in volume of fuel entering the vapourizer. Pressure fluctuations are damped out by running the high pressure fuel injector pump 138 at a pressure above that at which the metering section is designed to operate, then reducing it to a desired pressure of approximately 15 PSIG.

Bimetal thermostatic valve 116 comprises a small chamber containing a bimetal spiral actuating a rotary valve. This is interposed between the third stage 132 modifier and the carburettor system. If fuel from the third stage rises above about 200° C., for example, the valve admits some fuel gas directly from the cooler first stage 118 to the outlet line of the third stage, for admixture therein, to prevent the occurrence of lean mixtures and adverse effects on volumetric efficiency.

The fuel system as described and without substantial modification, can be used as a metering carburettor for LPG. The usual pressure control equipment (diaphragm regulator and anti-freeze heat exchanger) can be used and the LPG then fed directly to the gas shut-off valve 58. Alternatively, the gas can be fed directly into the inlet of the cracking system of unit 112.

Servicing and maintenance of the unit 112 is mainly confined to checking the catalyst for excessive carbon build up and possible choking of the system. This latter is readily detected by placing a pressure gauge on each side of the third stage catalyst chamber and observing whether there is a significant pressure drop during normal operation.

The canister can be renewed quickly and easily by removing the bolt-on lid from its cast housing.

The carburettor incorporates, because of its dual functionality, its own fail-safe system. Should malfunction occur in the fuel vapourization and/or cracking unit 112, opening of the high-pressure fuel pump circuit and manual setting of the override switch, can return the carburettor to spray operation immediately. The vehicle can be driven unlimited distance before overhaul of the gas system.

The general system such as shown in FIG. 4 may be used for the vapourization and thermal cracking of poorer quality fuels of much higher flash point and initial boiling point. Such a use is of advantage where regulations prohibit the use of petrol (gasoline) engines and restrict power plants to those of the diesel type.

Where these fuels may be used in spark-ignition engines (after modification according to the described method of this invention), the attainment of a suitably vapourized fuel/air mixture for restarting could present difficulties.

Electric heaters within, for example, the starting carburettor section could provide a solution but by the provision of an additional, accumulation chamber, connected in parallel between the second and third stage cracking chambers or between the third stage and the metering unit, the system can provide for restart conditions following normal temperature operation. A modified system having such chamber now will be described with reference to FIG. 6, wherein like parts have the same reference numerals as in FIG. 4.

Figure 6:
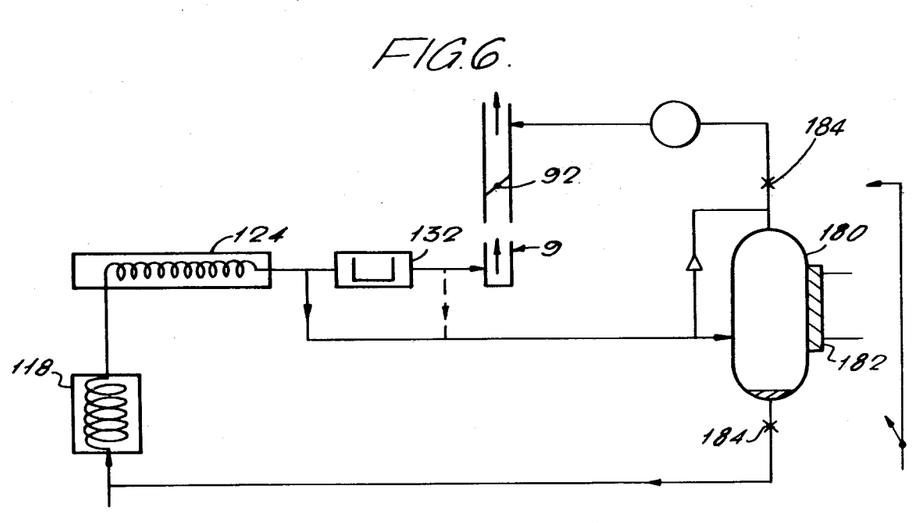
FIG. 6 is a schematic representation of a modified form of the system of FIG. 4.

The function of the chamber, and the means by which it may be incorporated in the system of FIG. 4, is as follows:

Hot gaseous fuel is led into the accumulation chamber 180 at normal operating pressure. The chamber may be provided with either water or air cooling means 182, whereupon condensable compounds settle out and are allowed to return, via suitable valves 184, to the first stage evaporator. During operation of the engine, non-condensable gases will accumulate within the chamber, until a point is reached where no further cracked fuel will enter the chamber, i.e. when the pressure of the non-condensable gases equilibrates to the pressure of operation.

At engine shut-down, isolation valves 184 attached to the accumulator, may be closed, e.g. electromagnetically, thereby leaving the system charged with gaseous fuel for restarting.

The cold restarting procedure then requires a modification of that suggested for volatile fuels and in particular could provide for short-period supply (after initial restart on accumulator gas) of vapourized fuel directly from Stage 2 to a metering orifice on the engine side of the carburettor butterfly valve.

Control of the valves required for this operation can be governed by the thermo-switch in an exactly similar manner to that described for initial fuel spray operation using volatile fuels (FIG. 4).

It will be appreciated that apart from the very short chain hydrocarbons like methane and ethane, thermal cracking produces a variety of hydrocarbons. The energy available from the combustion of the cracked products is higher than that from the combustion of the original uncracked fuel of equivalent carbon and hydrogen composition. This is directly reflected in the chemical bond energies of the otherwise equivalent fuels and is the direct result of restoring, endothermically, some of the waste exhaust heat into the incoming fuel.

Further use can be made of the large amount of waste heat available to produce even further quantities of hydrogen through the reaction of water with hydrocarbons under heat-controlled catalytic conditions, according to the equation:

$$C_nH_{2n+2} + n\, H_2O \rightarrow n\, CO + 2(n+1)H_2 + \Delta H^*$$

The technique suffers, however, from the need, as can be seen from the equation, for a high mole ratio of water to hydrocarbon; so that for fuels of even medium carbon number, n, the catalyst must be extremely efficient.

Furthermore in accordance with the laws of mass action, a water/hydrocarbon ratio well in excess of the stoichiometric value is often required to drive the reaction sufficiently from left to right. Separation of excess water after reaction puts the scheme at a disadvantage for practical automobile operational purposes. Also there is usually a requirement for regeneration with suitable types of catalyst which can become choked with carbon. Given these problems, complete flame quenching generally has been found to occur quite rapidly under practical operating conditions.

Proportioning water to fuel using metering pumps is expensive and again suffers that disadvantage, described above for liquid fuel systems, of the requirement to maintain high accuracy with liquids delivered in small volumes.

Notwithstanding these remarks, some water, additional to that which is inspired as a variable constituent of normal engine air, is desirable in hydrocarbon fuels. It is considered simpler, and much cheaper for comparable accuracy, to incorporate it in the fuel itself such as by solubilization via suitable additives e.g. alcohols.

Such mixtures can be fed with advantage directly into the thermal cracking devices described herein. Less carbon is formed during thermal cracking, indicating the operation, to some degree, of the reaction shown above and/or the alternative water gas reaction $$C + H_2O \rightarrow Co + H_2 + \Delta H^*$$

Furthermore the system is capable of use as a compound petrol and/or LPG system where there is a choice of four operating modes
 (1) liquid fuel spray
 (2) hot cracked (modified) fuel
 (3) hot LPG or
 (4) cold (direct) LPG Finally, it is to be understood that various alterations, modifications and/or additions may be introduced into the constructions and arrangements of parts previously described without departing from the spirit or ambit of the invention.

The claims defining the invention are as follows:

1. An internal combustion engine having a fuel supply system; a fuel induction system; an exhaust system including an exhaust manifold and an exhaust discharge conduit; and means for modifying fuel supplied to the engine; said fuel modifying means comprising: a first chamber having an inlet and an outlet for passage of fluid hydrocarbon fuel therethrough; said first chamber having a tortuous, labyrinth path for the fuel flow from said inlet to said outlet; said first chamber being incorporated in said exhaust discharge conduit and being adapted for external heating by the exhaust in said exhaust discharge conduit whereby fuel received at said inlet as a liquid is thermally cracked during flow to said outlet; a second chamber having an inlet and an outlet; said second chamber inlet being in communication with said first chamber outlet for receiving fuel from said first chamber, said second chamber outlet being in communication with said fuel induction system for the supply of fuel thereto; said second chamber containing a cracking catalyst for hydrocarbon fuel; and said second chamber being mounted on the exterior of said exhaust manifold to thereby expose fuel in said second chamber to exhaust gas heat sufficient to effect catalytic cracking of the fuel.

2. The internal combustion engine of claim 1 wherein said first chamber is annular in form having inner and outer cylindrical walls, there being a helical baffle between said cylindrical walls to provide for tortuous flow of fuel between said inlet and said outlet of said first chamber, the arrangement being such that exhaust gas in said exhaust conduit heats said first chamber by flow around said outer cylindrical wall and through a bore defined by said inner cylindrical wall.

3. The internal combustion engine of claim 2 wherein said second chamber includes an enclosure for said catalyst with the walls of said enclosure having a duct therein connected to the interior of said exhaust manifold for the supply of hot exhaust gas from said manifold to said duct for heating said second chamber; and a temperature responsive valve means for opening and closing said duct to maintain a predetermined chamber temperature.

4. An internal combustion engine having a fuel supply system; a fuel induction system; an exhaust system including an exhaust manifold and an exhaust discharge conduit; and means for modifying fuel supplied to the engine; said fuel modifying means comprising: a first chamber having an inlet and an outlet for passage of fluid hydrocarbon fuel therethrough; said first chamber being located in the interior of said exhaust manifold for direct, external flame heating by exhaust gas whereby fuel received at said inlet is thermally cracked during flow to said outlet; a second chamber having an inlet and an outlet; said second chamber inlet being in communication with said first chamber outlet for receiving fuel from said first chamber; said second chamber outlet being in communication with said fuel induction system for the supply of fuel thereto; said second chamber containing a cracking catalyst for hydrocarbon fuel; and said second chamber being mounted on the exterior of said exhaust manifold to thereby expose fuel in said second chamber to exhaust gas heat sufficient to effect catalytic cracking of the fuel.

5. The internal combustion engine of claim 4 wherein said first chamber comprises an elongate conduit which extends at least once between opposed ends of said exhaust manifold and is in close proximity to at least one inlet branch of said manifold.

6. An internal combustion engine having a fuel supply system; a fuel induction system; an exhaust system including an exhaust manifold and an exhaust discharge conduit; and means for modifying fuel supplied to the engine; said fuel modifying means comprising: first, second and third chambers; each of said chambers having an inlet and an outlet; said outlet of said first chamber being in communication with said inlet of said second chamber; said outlet of said second chamber being in communication with said inlet of said third chamber; said outlet of said third chamber being in communication with said fuel induction system whereby fuel passes from said first chamber to said second chamber to said third chamber and then to said fuel induction system; said first chamber having a tortuous, labyrinth path for the fuel flow from its inlet to its outlet; said first chamber being incorporated in said exhaust discharge conduit and being adapted for external heating by the exhaust in said exhaust discharge conduit whereby fuel received at said first chamber inlet as a liquid is vaporized during flow to said first chamber outlet; said second chamber being located in the interior of said exhaust manifold for direct, external flame heating by exhaust gas whereby fuel received at said second chamber inlet is thermally cracked during flow to said second chamber outlet; said third chamber containing a cracking catalyst for hydrocarbon fuel; said third chamber being mounted on the exterior of said exhaust manifold to thereby expose fuel in said third chamber to exhaust gas heat sufficient to effect catalytic cracking of the fuel.

7. An engine according to claim 6 and including an accumulation chamber for storing gaseous hydrocarbon fuel that is non-condensible at ambient temperature; and a first conduit providing the communication between said second chamber and said third chamber and a second conduit providing the communication between said third chamber and said fuel induction system; said accumulation chamber having an inlet in communication with at least one of said first conduit and said second conduit and an outlet providing communication between said accumulation chamber and said fuel induction system, whereby a portion of the fuel is accumulated in said accumulation chamber during normal operation of the engine for use in a subsequent start-up of the engine until attainment of a predetermined engine temperature.

8. An engine according to claim 7 wherein said accumulation chamber has a further outlet for recycling any condensed fuel accumulating therein; said further outlet being in communication with said inlet of said first chamber.

9. An engine according to claim 7, wherein said accumulation chamber is provided with cooling means for cooling fuel supplied thereto and thereby separating condensible and non-condensible fractions of such fuel.

10. An engine according to claim 6 wherein a conduit provides the communication between said first chamber and said second chamber and said conduit extends within said exhaust system.

11. An internal combustion engine having a fuel induction system for metering of gaseous hydrocarbon fuel to the engine; a exhaust system including an exhaust manifold and an exhaust discharge conduit; and means for modifying fuel supplied to the engine; said fuel modifying means comprising a chamber located in said exhaust conduit having an inlet for receiving liquid fuel from a fuel supply for the engine and an outlet for passage of fluid hydrocarbon fuel therethrough to said induction system; said chamber being of an annular form having an outer encircling wall and an inner wall spaced from said outer encircling wall, with said inlet and said outlet being adjacent a respective end of said chamber; there being a helical baffle extending through said chamber between said outer wall and said inner wall to define a tortuous, labyrinth path for the flow of fuel from said inlet to said outlet; the chamber being adapted for external heating in said exhaust conduit by flow of exhaust gas over said outer wall and through a bore defined by said inner wall whereby fuel received as a liquid at said inlet of said chamber is vaporized and thermally cracked during flow to said outlet thereof.

12. An internal combustion engine having a fuel induction system for metering of gaseous hydrocarbon fuel; a fuel modification system; an exhaust system including an exhaust manifold and an exhaust conduit; said fuel modification system comprising a first fuel modification stage for receiving fuel from a source of liquid hydrocarbon fuel and including a housing positioned in said exhaust conduit for contact with hot exhaust gases of said engine whereby fuel passing therethrough is vaporized and thermally cracked; a second fuel modification stage for receiving fuel from said first stage and including a housing positioned within said exhaust manifold for direct flame contact with exhaust gases of said engine whereby fuel passing therethrough is thermally cracked; and a third fuel modification stage for receiving fuel from said second stage and including a housing for hydrocarbon fuel cracking catalyst mounted on said exhaust manifold exteriorly thereof wherein fuel passing therethrough may be catalytically cracked; and means connecting said third stage to said fuel induction system for supply of modified fuel to said engine.

13. An engine according to claim 12, including a fuel circuit for bypassing said fuel modification system for supply of liquid fuel directly to said fuel induction system on engine start-up; said bypass circuit having associated therewith means responsive to engine operating temperature for closing the bypass circuit at a predetermined engine temperature and bringing said fuel modification system into communication with said induction system.

14. An engine according to claim 13 wherein said bypass circuit and said fuel modification system each has a control valve; said means responsive to operating temperature being a thermal-switch adapted to close and open said bypass circuit valve and open and close said fuel modification system valve in dependence on the engine temperature being at or below a predetermined temperature.

15. An engine according to claim 14 wherein said bypass circuit includes a float controlled fuel bowl for receiving fuel from said source of liquid hydrocarbon fuel via said bypass circuit valve; said induction system having a jet bridge; said bypass circuit having a second control valve; and said float controlled fuel bowl supplies fuel to said jet bridge via said second control valve which is openable and closable with opening and closing of said first bypass circuit valve.

16. An engine according to claim 15, wherein said bypass circuit has a line providing communication between said fuel bowl and said induction system; said line having a valve therein operable on engine start-up to supply reserve fuel to said induction system.

17. An engine according to claim 12, wherein said means connecting said third fuel modification stage to said induction system includes a needle and a gaseous fuel metering chamber; said needle controlling said gaseous fuel metering chamber; said needle being movable for variation of the volume of metered gaseous fuel in dependence on pressure within said induction system.

18. An engine according to claim 17 including a fuel circuit for bypassing said fuel modification system for supply of liquid fuel directly to said fuel induction system on engine start-up wherein said bypass circuit has a liquid fuel metering chamber and said needle is common to said gaseous fuel metering chamber and to said liquid fuel metering chamber to provide a bifunctional carburettor system operable with fuel of either of said fuel modification system and said bypass circuit to supply a respective one of gaseous and liquid fuel to said induction system in dependence on pressure in said induction system.

19. An engine according to claim 18, wherein said gaseous fuel metering chamber has an inlet; said needle has a tapered portion at said gaseous fuel metering chamber inlet for controlling the volume of gaseous fuel received therein, said gaseous fuel metering chamber having an outlet in communication with said induction system which bypasses said liquid fuel metering chamber.

20. An engine according to claim 12 and including accumulation means for receiving from said fuel modification system a portion of the gaseous hydrocarbon fuel which is non-condensible at ambient temperature and for supplying the gaseous hydrocarbon fuel for use in a subsequent start-up of the engine until attainment of a predetermined engine temperature.

21. An engine according to claim 20 wherein said accumulation means includes an accumulation chamber for storing gaseous hydrocarbon fuel that is non-condensible at ambient temperature; a first conduit providing the communication between said second stage and said third stage and a second conduit providing the communication between said third stage and said fuel induction system; said accumulation chamber having an inlet in communication with at least one of said first conduit and said second conduit and an outlet providing communication between said accumulation chamber and said fuel induction system whereby a portion of the fuel is accumulated in said accumulation chamber during normal operation of the engine for use in a subsequent start-up of the engine until attainment of a predetermined engine temperature.

22. An engine according to claim 21 wherein said accumulation chamber has a further outlet for recycling any condensed fuel accumulating therein; said further outlet being in communication with said first stage.

23. An engine according to claim 21, wherein said accumulation chamber is provided with cooling means for cooling fuel supplied thereto and thereby separating condensible and noncondensible fractions of such fuel.

24. An internal combustion engine having a fuel induction system for metering of gaseous hydrocarbon fuel to the engine; an exhaust system including an exhaust manifold; a fuel supply for the engine and a fuel modification means for cracking fuel to be received by the induction system; the modification means comprising a housing defining a chamber having an inlet for receiving fuel from said fuel supply and an outlet for passage of fluid hydrocarbon fuel therethrough to said induction system; said housing being an elongate conduit disposed in said exhaust manifold and extending at least once between opposed ends of said exhaust manifold, said housing being in close proximity to at least one inlet branch of said manifold for direct, maximum external flame heating whereby fuel received at said inlet is thermally cracked during flow to said outlet.

25. An internal combustion engine having a fuel induction system for metering of gaseous hydrocarbon fuel to the engine; an exhaust system including an exhaust manifold; a supply of liquid fuel for the engine and a fuel modification means for cracking fuel to be received by the induction system; the modification means comprising means for converting fuel from said supply to a gaseous form and a housing containing a dehydrogenation cracking catalyst for hydrocarbon fuel; said housing having an inlet by which fuel is receivable from said fuel converting means and an outlet communicating with said fuel induction system of the engine; said housing being defined by a heavy-walled metal enclosure for the catalyst mounted on said exhaust manifold; the walls of the enclosure having a duct therein in communication with the interior of said manifold for the supply of hot exhaust gas from said manifold to said duct as a means of supplying heat to fuel received by said housing from said fuel converting means; there being temperature responsive valve means for controlling flow of exhaust gas from the manifold through said duct and operable, on attainment of a predetermined housing temperature at which said catalyst liberates hydrogen from the fuel for supply to the engine, to open and close said duct to control such flow for maintenance of said predetermined temperature.

26. An internal combustion engine having a fuel induction system for metering of gaseous hydrocarbon fuel to the engine; an exhaust system including an exhaust manifold and an exhaust discharge conduit; and means for modifying fuel supplied to the engine; said fuel modifying means comprising first and second housings each defining a respective chamber having an inlet and an outlet, with said outlet of said first chamber being in communication with said inlet of said second chamber; said first chamber being incorporated in said discharge conduit and having therein a tortuous, labyrinth path for fuel flow from said inlet to said outlet thereof; said first chamber being adapted for external heating by exhaust gas in said discharge conduit whereby fuel received at said inlet thereof is vaporized and thermally cracked during flow of said outlet; said second housing being disposed interiorly of said exhaust manifold for direct, external flame heating by exhaust gas, whereby fuel received at said second chamber inlet is further thermally cracked during flow to said second chamber outlet for supply to said induction system.

27. An internal combustion engine according to claim 26, wherein said second housing is in the form of an elongate conduit extending at least once between opposed ends of said exhaust manifold; said elongate conduit extending in close proximity to at least one of the inlet branches of said exhaust manifold for maximum flame heating thereat.

28. An engine according to claim 27, wherein said first housing is defined by inner and outer cylindrical walls and a respective annular end wall across each end of an annular chamber defined between said cylindrical walls; there being a helical baffle between and coaxial with said cylindrical walls to provide for tortuous flow of fuel between said inlet and said outlet of said first housing; the arrangement being such that exhaust gas in said exhaust conduit heats said first chamber by flow around said outer cylindrical wall and through a bore defined by said inner cylindrical wall.

29. An internal combustion engine according to claim 6 wherein said first chamber includes inner and outer concentric cylindrical walls and two annular end walls between said concentric cylindrical walls at the ends thereof; said first chamber inlet positioned at one end of said cylindrical walls and said first chamber outlet positioned at the opposite end of said cylindrical walls; and a helical baffle between and coaxial with respect to said cylindrical walls whereby said tortuous, labyrinth path for fuel flow between said inlet and said outlet is provided.

30. An internal combustion engine according to claim 29 wherein said first chamber is longitudinally disposed within said exhaust discharge conduit whereby exhaust gas in said conduit heats said first chamber by flow around said outer cylindrical wall and through an open bore defined by said inner cylindrical wall.

31. An internal combustion engine according to claim 30, wherein said second chamber is an elongate duct, a portion of which conforms to the curvature of said exhaust manifold and a second portion of which is in close proximity to at least one of the inlet branches of said exhaust manifold for maximum flame heating.

32. An engine according to claim 31 wherein said first, second and third chambers are all spaced from one another.

33. The internal combustion engine of claim 24 wherein said housing extends at least once across the inlet ports of said manifold.

34. The internal combustion engine of claim 25 including means for the selective separation of the hydrogen formed by said cracking catalyst; said exhaust system containing a catalytic reactor for the removal of nitrogen oxides; and means for feeding said hydrogen to said catalytic reactor.

35. The internal combustion engine of claim 5 wherein said second chamber includes an enclosure for said catalyst with the walls of said enclosure having a duct therein connected to the interior of said exhaust manifold for the supply of hot exhaust gas from said manifold to said duct for heating said second chamber; and a temperature responsive valve means for opening and closing said duct to maintain a predetermined chamber temperature.

* * * * *